3,269,847
PHOTOTROPIC GLASS AND METHODS
Alvin J. Cohen, Pittsburgh, Pa., assignor to Pittsburgh Plate Glass Company, Pittsburgh, Pa., a corporation of Pennsylvania
Filed July 3, 1962, Ser. No. 207,363
5 Claims. (Cl. 106—52)

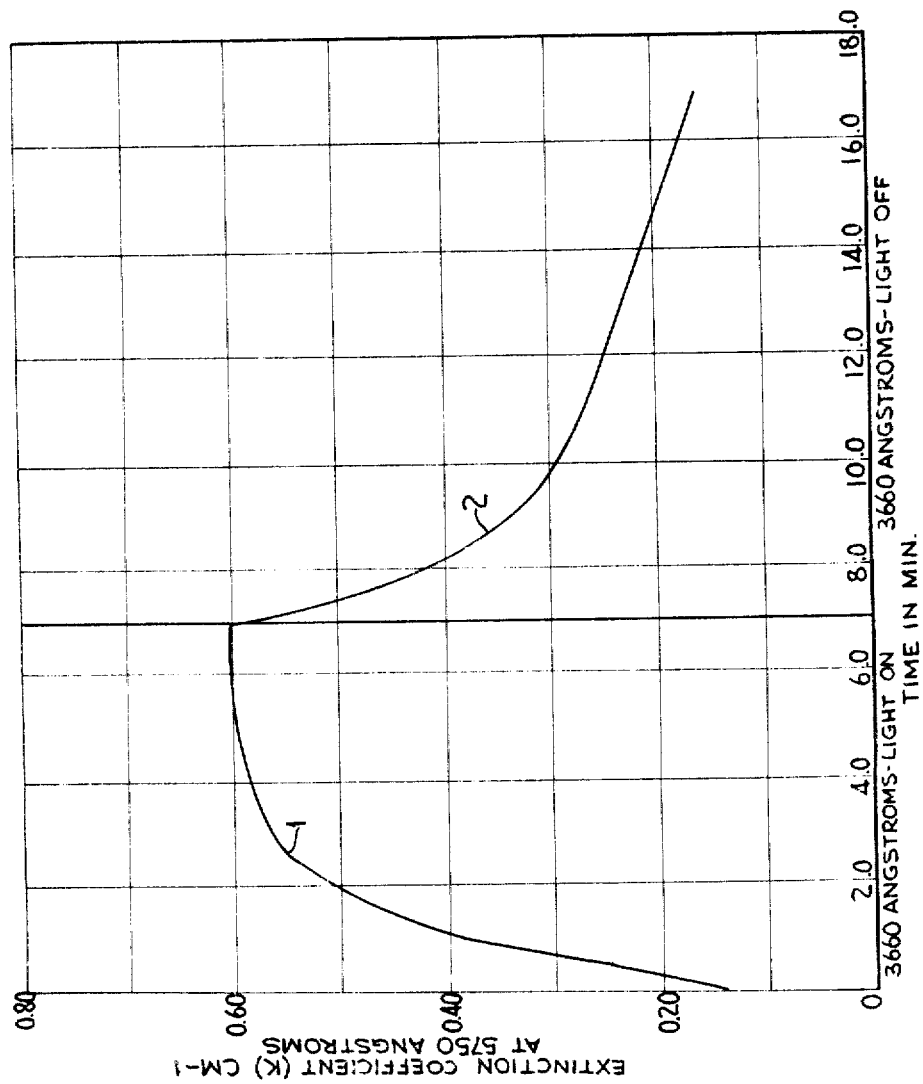

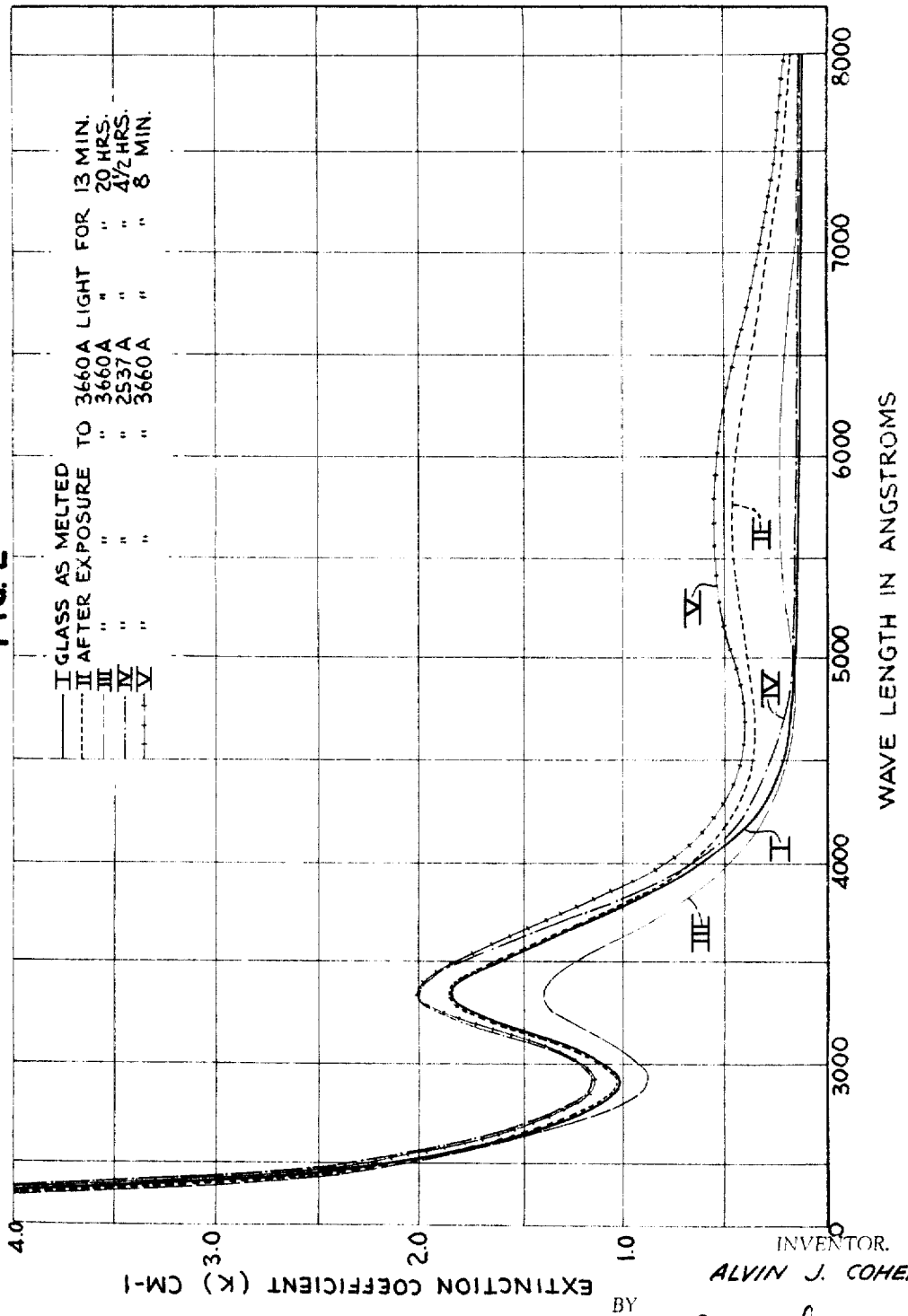

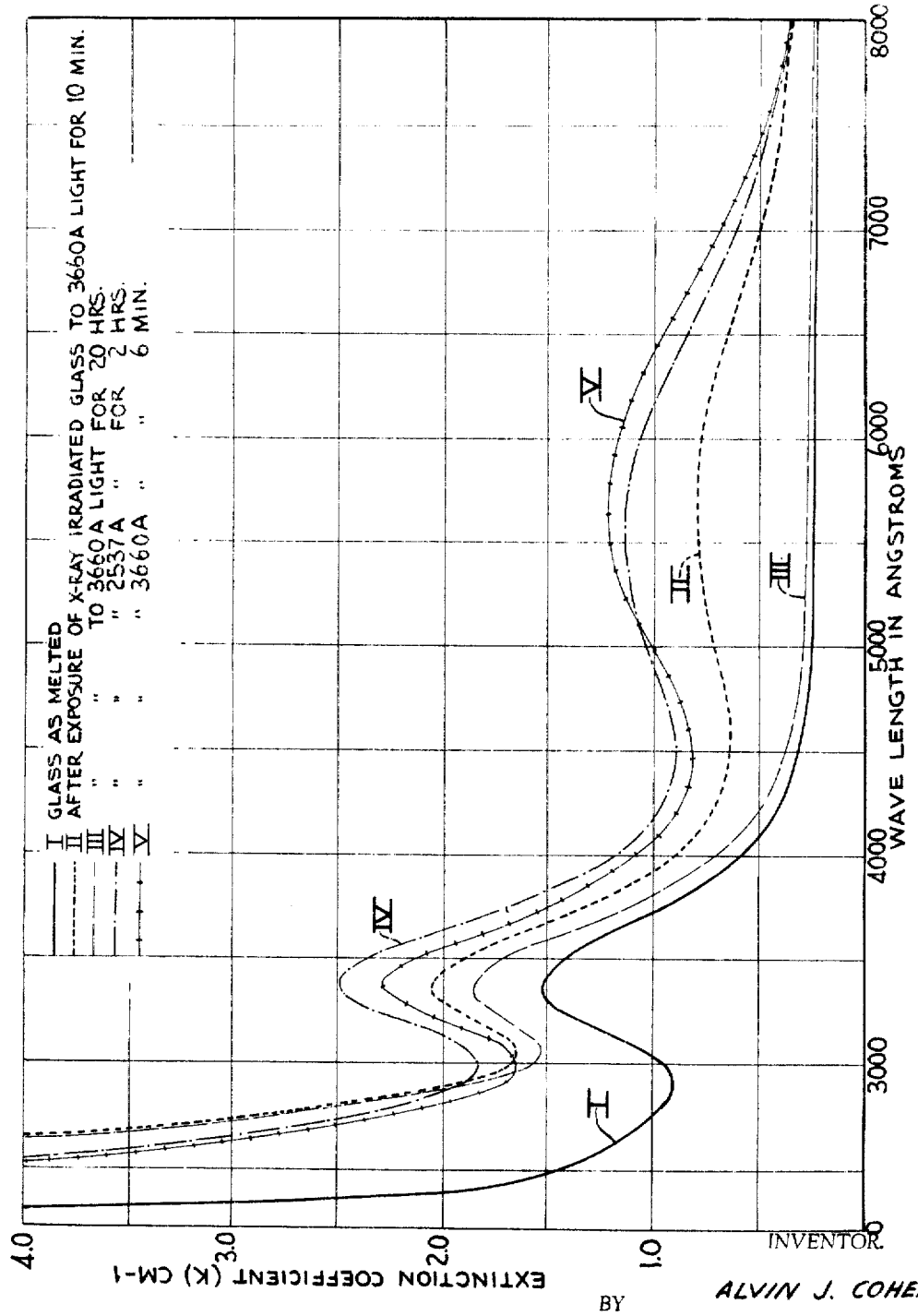

The present invention relates to a phototropic glass and to processes for producing a phototropic glass. The present invention particularly relates to glasses which exhibit a phototropic effect when irradiated with ultraviolet light and to articles of manufacture made from the phototropic glasses.

A phototropic glass is one that has the ability to color when irradiated with light in a particular wavelength region and whose color fades when the exciting radiation is removed.

A phototropic glass will have many practical uses in our present society. Phototropic glass can be incorporated into ordinary prescription eye glasses which automatically become sunglasses when the wearer goes outdoors; into automobile windshields which darken and fade in response to sunlight; into camera lenses which regulate the amount of light allowed to reach the film; into building construction which automatically regulates the amount of light allowed to penetrate the building's interior to keep the building cool in summer and warm in the winter; into calibrated glass dosimeters which yield an almost instantaneous reading of the ultraviolet and higher energy radiation striking the glass; and into windows in the home that act as automatic curtains or blinds. These few examples indicate the present invention's usefulness.

It has been discovered that a phototropic glass can be produced by incorporating small effective amounts of europium into a glass and preparing the glass under reducing conditions. Strong reducing conditions favor the development of europous ($Eu^{+2}$) ion in the glass. The europous ($Eu^{+2}$) ion exhibits a strong absorption band in the ultraviolet range centered at 3280 angstroms. If the glass is prepared under inadequate reducing conditions, the europium tends to exist as europic ($Eu^{+3}$) ion which does not exhibit a suitable absorption band in the ultraviolet range to produce a phototropic glass. Reducing conditions during manufacture of the glass also appear to favor the development of glass structure environments that can develop metastable color centers which exhibit an absorption band at about 5750 angstroms.

A glass which has been prepared under reducing conditions and contains europous ($Eu^{+2}$) ion has the ability to color amethyst when it is irradiated with ultraviolet radiation. While it is not known, it is theorized that when an europous ($Eu^{+2}$) ion absorbs radiation in the ultraviolet range, an electron from one of the europous ion's outer shells is raised to an excited energy level which results in the electron being displaced from the europous ion. It is further theorized that this displaced electron is subsequently trapped in some unknown type of trapping environment which exists in the glass structure and which is physically close to the europous ion, thereby producing a color center in the glass. It is this color center, which absorbs visible light in a band centered at about 5750 angstroms in the visible spectrum, which produces the characteristic amethyst color exhibited by phototropic glass.

The color center produced in the glass structure prepared under reducing conditions is unstable and it spontaneously decays causing the color to fade. The exciting ultraviolet radiation is continuously creating new color centers in the glass structure. These color centers continuously decay after they are formed and the rate of their decay is somewhat slower than that of their formation. The result is, therefore, that the glass colors as it is irradiated until a saturation level is reached. The saturation level is reached when the rate of color center formation equals the rate of color center decay and it is dependent upon the number of glass structure environments (defects) that exist in the glass which can form color centers of the type that exhibit the 5750 angstrom absorption band. The glass fades when the exciting radiation is removed because no new color centers are being formed while the already formed color centers are continuously spontaneously decaying under ambient temperature conditions.

It is postulated that the destruction of the color center is the result of the trapped electron being released by the color center. This changes the color center to an incipient color center trapping site which can subsequently become a color center again upon trapping an electron. Because the color center is only created when the europous ($Eu^{+2}$) ion absorbs ultraviolet radiation and the color center formed spontaneously decays, the glass colors and fades in response to the exciting ultraviolet radiation which strikes the glass containing europous ($Eu^{+2}$) ions. Glass prepared according to the present invention can be colored and faded repeatedly when the electron released by the decaying color center finds its way back to an europous ($Eu^{+2}$) that has lost one of its electrons.

If a glass is prepared under inadequate reducing conditions and the more stable form of europium ion develops, namely, europic ($Eu^{+3}$) ion instead of the desired europous ($Eu^{+2}$) ion, the glass can be rendered phototropic by irradiation with X-rays. It is theorized that X-ray radiation of glasses containing europic ($Eu^{+3}$) ions produces phototropic behavior by altering the europic ($Eu^{+3}$) ion to an europous ($Eu^{+2}$) ion or a type of an europium ion best described as an europic ion plus an electron ($Eu^{+3}+e^-$). It has been discovered that X-ray irradiation of a glass containing europic ions produces a glass whose europium ions have an absorption band in the ultraviolet range centered at 3400 angstroms. The europous ($Eu^{+3}+e^-$) absorption band has the same absorption band width at half-maximum and the same general phototropic inducing properties as the europous ($Eu^{+2}$) absorption band but the $Eu^{+3}+e^-$ absorption band is centered at a lower energy (longer wavelength).

The difference in the locations of the absorption bands between the europous ($Eu^{+2}$) ion or ($Eu^{+3}+e^-$) ion developed in the X-ray irradiated glass and the europous ($Eu^{+2}$) ion developed in glasses prepared under strong reducing conditions is believed to be due to the differences in the types of europium ion environments that are produced in each case. The environment that develops in the glass about the europous ($Eu^{+2}$) ion that has been prepared under strong reducing conditions can be viewed as the normal environment created whenever a plus two ($+2$) valence ion is trapped in the glass matrix as the glass cools. The environment that exists about the type of europous ($Eu^{+2}$) ion or $Eu^{+3}+e^-$ ion developed by X-ray irradiation corresponds to the normal environment created whenever a plus three ($+3$) valence ion is trapped in the glass matrix as the glass cools. Both the $Eu^{+2}$ ion and the $Eu^{+3}+e^-$ ion have absorption bands in the ultraviolet range which can be used to develop phototropic glasses.

The base glass compositions that can be used to prepare phototropic glasses include soda-silica compositions and soda-lime-silica compositions such as are conventionally used in the manufacture of window and plate glass. The reduced base glasses can contain the following ingredients in percent by weight: 45 to 80% $SiO_2$, 10 to 50% of alkali metal oxides including 10 to 50% Na$_2$O and 0 to 10% K$_2$O, 0 to 30% alkaline earth metal oxides including 0 to 20% CaO and 0 to 10% MgO and 0 to 5% Al$_2$O$_3$, as well as amounts of other glass making ingredients, such as BaO, ZnO, PbO, SrO, B$_2$O$_3$, HfO$_2$, ZrO$_2$ and fluorine, which do not adversely affect the phototropic effects of the glass while imparting other desirable properties to the glass, such as the desired coefficient of expansion, index of refraction, softening point, strain point, liquidus temperature, devitrification rate, melting rate, etc. Typical soda-lime-silica base glasses contain by weight 60 to 75% SiO$_2$, 10 to 20% Na$_2$O, 0 to 10% K$_2$O, with the total alkali metal oxide content being 10 to 21%, 5 to 16% CaO, 0 to 10% MgO, with the total alkaline earth metal oxide content being 5 to 18% and 0 to 5% Al$_2$O$_3$.

The invention is described with reference to an absorption band centered at about 5750 angstroms. It is to be understood that this band may be shifted slightly depending upon the base ingredients in the glass, i.e., the acidity of the glass.

It is necessary, however, to prepare the base glasses from raw materials of high purity because many of the elements normally present as impurities in the raw materials for glass preparations inhibit phototropic behavior. It has been discovered that iron, vanadium, tantalum and titanium present in the glass in small amounts inhibit the phototropic behavior. For example, 52 parts per million (p.p.m.) by weight of iron in an ordinary soda-lime-silica phototropic glass composition reduces the colorability of the glass to about 60 percent of the value it would have if it were iron free. Titanium has the same inhibiting or poisoning effect on the phototropic properties of the glass as does iron but to a lesser degree. Investigations thus far indicate that 25 p.p.m. of iron and 50 p.p.m. of titanium are about the upper limits of these inhibitors when both are present that a phototropic glass will tolerate. Elements such as hafnium and zirconium, on the other hand, contribute the beneficial effect of enhancing the intensity of the color induced in the glass. Other inhibitors and color enhancing agents which are unknown at the present time undoubtedly also exist.

Glasses prepared under strong reducing conditions have been observed to transmit higher percentages of incident ultraviolet radiation than glasses of similar compositions prepared under oxidizing conditions. It is known that the higher oxidation states of species such as Ti$^{+4}$ and Fe$^{+3}$ exhibit very strong absorption bands in the ultraviolet region as compared with species such as Ti$^{+3}$ and Fe$^{+2}$. While it is not known, it is theorized that the enhanced ultraviolet transmission of reduced glasses is due in a large part to the reduction of the impurities such as Ti$^{+4}$ and Fe$^{+3}$ contained in the glass.

It is theorized that the metallic ions which act as phototropic inhibitors poison phototropic behavior by competing with the unstable trapping centers for the excited electrons from the europous (Eu$^{+2}$) ions or the (Eu$^{+3}$+e$^-$) ions that have absorbed ultraviolet radiation. It has also been noted that many color centers which develop in the presence of the inhibiting or poisoning elements are not of the type that will spontaneously decay upon removal of the ultraviolet radiation and so do not yield a fast fading type of phototropic glass.

Glasses prepared according to the present invention are initially colorless or slightly yellow. The higher the concentration of europium, the more yellow are the unirradiated glasses. Upon being irradiated with an ultraviolet light source up to wavelengths of about 3800 angstroms, or exposure to sunlight, the glasses color amethyst to a near maximum saturation level in about 1 minute or less, with a noticeable amethyst color developing upon 5 to 15 seconds irradiation. The color exhibited by the glass when irradiated with ultraviolet radiation is amethyst due to the glass' metastable color center absorbing light in a band centered at 5750 angstroms in the visible range.

Removal of the exciting ultraviolet radiation allows the metastable color centers to decay and the amethyst color to fade. The extinction coefficient of the glass drops to a minimum level for 5750 angstroms light in about 5 minutes, with little color being noticeable one minute after the exciting radiation is removed.

The extinction coefficient is a measure of a material's ability to absorb light. The extinction coefficient (K) is a number obtained by dividing the optical density (O.D.) by the sample thickness in centimeters (cm.). The extinction coefficient (K) therefore has the unit of cm.$^{-1}$.

$$K = O.D./\text{thickness in cm.}$$

Optical density is the logarithm to the base 10 of the reciprocal of the transmittance (T) or $$O.D. = \log \frac{1}{T}$$

The transmittance (T) is the fraction of the incident light that is transmitted or passes through the glass sample. The transmittance is found by dividing the amount of light transmitted by the amount of light that enters the sample.

$$T = \frac{\text{light transmitted}}{\text{incident light}}$$

If a glass sample transmits 25 percent of the incident light of a given wavelength and it is 3 millimeters thick, the extinction coefficient (K) is found by the following calculation:

$$O.D. = \log \frac{1}{T} = \log \frac{1}{.25} = \log 4 = 0.602$$

$$K = \frac{O.D.}{\text{thickness in cm.}} = \frac{0.602}{.30} = 2.007 \text{ cm.}^{-1}$$

$$K = 2.007 \text{ cm.}^{-1}$$

It should be noted that from the nature of the extinction coefficient measurement difficulty in comparing various phototropic glass samples may be encountered. Two glass samples upon being tested may yield the same numerical value for their respective extinction coefficients and vary greatly in their ability to color. The value given for the extinction coefficient of a glass sample alone cannot reveal whether the sample colored very intensely at its surface and very sligthly the rest of the way through its tested thickness or whether the glass sample colored essentially uniformly throughout its thickness. It should be appreciated that a glass which has the ability to color very intensely at its surface will absorb a great deal of the exciting ultraviolet radiation at that point and thereby prevent the exciting radiation from penetrating its interior to cause further coloration of the sample. On the other hand, if a glass sample which has the ability to color, can color uniformly throughout its thickness, it will still yield a high extinction coefficient measurement.

To compare adequately and precisely the colorability of two phototropic glass samples therefore, the extinction coefficient alone is not the only factor to consider. Care must taken to also account for the thickness or relative thicknesses of the glass samples being compared. The only time the straight comparisons of extinction coefficients will be completely accurate will be in the case where the two glass samples are very thin and nearly all of the exciting ultraviolet radiation is either transmitted or uniformly absorbed in the tested thickness of the glass sample.

The phototropic glasses prepared according to the present invention have the property of fatiguing upon prolonged and repeated exposure to exciting ultraviolet irradiation. Fatigue is a phenomenon whereby phototropic glasses upon being repeatedly or continuously exposed to light in the range of 3660 angstroms progressively lose their ability to color to the same intensity that they could initially. Phototropic glasses exposed to 3660 angstrom light for a long cumulative period of time still have the type of color centers which exhibit phototropic behavior.

The fatiguing of a phototropic glass prepared according to the present invention is rapid at first but gradually decreases over the period of exposure to ultraviolet radiation. After a phototropic glass has been bleached by 3660 angstrom light for a period of time and the initial high rate of fatigue is completed, the glass tends to reach a saturation point during which the fatigue rate is very small with respect to time.

It has been discovered that a phototropic glass which has been fatigued can be resensitized by irradiating the fatigued phototropic glass with relatively high energy ultraviolet radiation somewhere about the vicinity of 2500 to 2600 angstroms. Treatment with the high energy ultraviolet radiation restores the sensitivity of phototropic glasses to their initial as melted strength or in some cases, even beyond the initial strength. Therefore, a phototropic glass prepared according to the present invention, even though it has the undesirable characteristic of fatiguing, can be resensitized by irradiation with a high energy ultraviolet light source. The fatigued glass sample can be repeatedly rejuvenated to its original phototropic sensitivity and in some cases even beyond its original sensitivity by irradiation with very deep ultraviolet light. Some glass samples have been found to resensitize themselves spontaneously upon standing for a time at room temperature in the absence of exciting ultraviolet radiation.

To produce a photographic glass, the amount of europium that is added to the glass composition must be controlled since the excess $Eu^{+2}$ causes the glass ot absorb sensitizing radiation at the surface and thus does not allow the glass to exhibit phototropicity except at the surface. Europium additions between 450 and 700 parts by weight of europium per million parts by weight of the europium containing glass have given the best phototropic glasses at thicknesses of about 1.5 millimeters. Good phototropic glasses which contain between 50 and 1500 parts by weight of europium per million parts by weight of the europium containing glass have also ben prepared, while the optimum concentration of europium for this glass thickness appears to be about 688 parts per million. The optimum amount of europium in a glass varies slightly depending on the thickness of the glass. Lesser concentrations of europium are required for thicker glass samples.

It is theorized that the europic ($Eu^{+3}$) ion may poison phototropic behavior in a manner similar to that exhibited by Fe, Ta, Ti and V, but this aspect of a possible poisoning mechanism is not understood.

The invention is further explained by the following examples and drawings. The drawings show the optical absorption curves of glasses prepared according to the present invention illustrating the absorption of ultraviolet radiation by the europous ion and the absorption in the visible spectrum centered at 5750 angstroms by a color center which colors the glass amethyst.

FIG. 1 is a graph containing an optical absorption curve which illustrates the phototropicity of a reduced, europium-containing glass of the present invention. The curve is a plot of the extinction coefficient of the glass at 5750 angstroms versus time as the glass is first exposed to 3660 angstrom light and the light is thereafter removed. It can be seen that the extinction coefficient of the glass at 5750 angstroms increases rapidly as the glass is exposed to the 3660 angstrom light. As the time of exposure continues for about 7 minutes, the maximum value for the extinction coefficient is approached and the curve levels off. This is the point at which the rate of formation and rate of decay of the color centers which absorb light at about 5750 angstroms is about the same. The glass is colored amethyst as a result of the exposure to 3660 angstrom light.

After 7 minutes, the 3660 angstrom light is removed and the glass is allowed to stand in the open air in a room illuminated by means of fluorescent lighting. The second portion of the curve in FIG. 1 illustrates the decay of the color centers and the fading of the amethyst color with time after removal of the 3660 angstrom light. The slope of the curve representing the extinction coefficient is quite steep at first and it gradually levels off after about 10 minutes. After about 10 minutes, the amethyst color is virtually gone.

To further explain the behavior of phototropic glasses two sets of experimental absorption curves are reproduced in FIGS. 2 and 3. The curves are plotted in terms of the extinction coefficient ($cm.^{-1}$) versus the wavelength of light absorbed in angstroms. FIGURES 2 and 3 of the drawings illustrate absorption curves of glasses of the present invention as produced according to several of the following examples:

Example I

A phototropic glass is prepared by mixing and melting the following ingredients together in the given amounts:

| Batch ingredient: | Weight (in grams) |
|---|---|
| Fused silica (Reagent grade) | 7.95 |
| Sodium carbonate monohydrate | 8.20 |
| $Eu_2O_3$ (Reagent grade 99.9% pure $Eu_2O_3$) | 0.0012 |

The fused silica is prepared by grinding about 10 grams of fused silica to a fine powder in a boron carbide mortar and pestle. The crushed silica is then placed in a 400 cubic centimeter Pyrex beaker and washed in aqua regia three times. The aqua regia solution is prepared from full strength hydrochloric acid (36.5 to 38.0 percent acid, specific gravity 1.185 to 1.192), and full strength nitric acid (70–71 percent acid, specific gravity 1.42). The aqua regia solution is made by mixing 75 cubic centimeters of full strength hydrochloric acid and 75 cubic centimeters of full strength nitric acid. The fused silica is washed by adding 50 cubic centimeters of the aqua regia solution to the 400 cubic centimeter Pyrex beaker and stirring the solution and fused silica with a Pyrex stirring rod. After each washing, the aqua regia is poured off. The fused silica is next washed with the same full strength hydrochloric acid used to make the aqua regia solution until the wash solution does not turn yellow. Each wash with hydrochloric acid uses about 50 cubic centimeters of the full strength acid solution. The fused silica is then washed with deionized water until the acid is removed. The washed fused silica is dried in an oven overnight at about 100° C. After drying the fused silica is cooled by standing in air and about 7.95 grams are weighed to be used in the glass batch.

An emission analysis of the prepared fused silica disclosed the following impurities:

$SiO_2$ Analysis

| Impurity: | Amount (percent by weight) |
|---|---|
| Boron | Trace |
| Calcium | Trace |
| Aluminum | 0.0001 |
| Iron | 0.0001 |
| Magnesium | 0.001 |

The boron impurity is introduced by the grinding operation in the boron carbide mortar.

The sodium carbonate monohydrate is used; and, while anhydrous $Na_2CO_3$ is equally suitable, the hydrated salt is more readily obtainable. $Na_2CO_3 \cdot H_2O$ is satisfactory because the water of hydration is automatically removed during the heating procedure in the preparation of the glass. The water removal is enhanced by the reducing conditions present in accordance with the following equations.

(1) 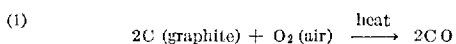
$$2C \text{ (graphite)} + O_2 \text{ (air)} \xrightarrow{heat} 2CO$$

(2) 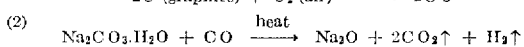
$$Na_2CO_3 \cdot H_2O + CO \xrightarrow{heat} Na_2O + 2CO_2\uparrow + H_2\uparrow$$

Water in an other batch ingredients is removed by similar reactions.

The analysis of $Na_2CO_3 \cdot H_2O$ reveals the following impurity contents:

$Na_2CO_3 \cdot H_2O$ Analysis

| Impurity: | Amount (percent by weight) |
|---|---|
| Insoluble material | 0.005 |
| Chloride | 0.003 |
| Nitrogen compounds | 0.0005 |
| Phosphate | 0.0005 |
| Sulfur compounds | 0.003 |
| $NH_4OH$ precipitate | 0.010 |
| Arsenic | 0.00005 |
| Ca+Mg precipitate | 0.005 |
| Heavy metals (as Pb) | 0.0001 |
| Iron | 0.0005 |
| Potassium | 0.02 |
| Silica ($SiO_2$) | 0.005 |

The powdered fused silica and $Na_2Co_3 \cdot H_2O$ are thoroughly mixed together by shaking in a new, unused stoppered polyethylene container and then transferred to a graphite melting crucible. The crucible is a right cylinder of graphite 2 inches high and 2 inches in diameter with a cavity 1 inch deep by 1 inch in diameter bored in it. Spectographic analysis disclosed that the crucible contained the following ingredients as impurities:

| Impurity: | Concentration parts per million |
|---|---|
| Calcium | 3 |
| Magnesium | 1 |
| Silica | 6 |

A solution of europium is prepared by dissolving the reagent grade 99.9 percent pure $Eu_2O_3$ in a nitric acid solution. The solution is prepared by placing 0.024 grams of $Eu_2O_3$ powder and 6 cubic centimeters of deionized water in a 50 cubic centimeter Pyrex beaker and adding 1 cubic centimeter of the same full strength nitric acid solution used to prepare the aqua regia to the water to dissolve the $Eu_2O_3$. After the $Eu_2O_3$ is completely dissolved, deionized water is added until a 10 cubic centimeter solution is obtained. The solution thus produced is 10 percent by volume nitric acid solution that contains 0.0012 gram of $Eu_2O_3$ per ½ centimeter of solution. One-half of a cubic centimeter of the $Eu_2O_3$ solution thus prepared is added to the fused silica and

powders contained in the graphite crucible.

Europium was added in solution because the amount of europium so added can be closely controlled and because the europium concentration is a critical factor in the production of a phototropic glass. The addition of europium in a solution also tends to promote a more uniform distribution of the small europium addition through the glass batch's raw materials. Care must be exercised in the preparation of the glass batch to prevent the inadvertent introduction of impurities which have the effect of inhibiting or poisoning the phototropic effect. Small amounts of iron, for example, can poison phototropic behavior and so a platinum or plastic spatula should be used to handle the glass batch raw materials whenever such handling is necessary instead of a spatula containing iron.

The crucible and batch materials are then placed in the work coil of a high frequency induction furnace and heated slowly to between 850° C. and 900° C. in the open air to remove the moisture from the batch. The temperature is held between 850° C. and 900° C. for a period of 10 to 15 minutes during which most of the $Na_2CO_3$ decomposes to $Na_2O$ and $CO_2$. After the

has been largely decomposed, the induction furnace is shut off and a graphite lid with a small hole in it is placed on the graphite crucible. The induction furnace is again turned on and the covered crucible containing the glass batch is heated to a temperature of about 1600° C. and held there for about an hour. The time required to reach 1600° C. is of the order of 15 to 20 minutes. After an hour of melting, the glass will be reasonably fined and of good optical quality. The induction coil furnace is then shut off.

The purpose of the lid on the graphite crucible is to insure that the glass is being prepared under intense reducing conditions. The lid keeps oxygen from the atmosphere from reaching the glass batch and the hole in the lid provides an escape for any carbon dioxide gas that evolves from the decomposition of any residual sodium carbonate that may still be present in the batch.

The covered graphite crucible is removed from the induction coil furnace and allowed to cool to room temperature by standing in air. The glass that has been produced weighs about 12 grams and is easily removed from the graphite crucible because the glass does not wet the crucible. The glass produced according to this procedure is slightly yellow in color due to the presence of europium cations and exhibits phototropic behavior. The glass analyzes as a sodium silicate glass

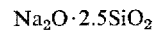

containing 100 parts by weight of europium metal per million parts by weight of glass.

The prepared glass upon being irradiated with ultraviolet light of 3660 angstroms colors amethyst and develops the ability to absorb about 32 percent of any 5750 angstrom light that strikes it. The ability to absorb 5750 angstrom light reaches a maximum in about 5 minutes when irradiated with 3660 angstrom ultraviolet radiation. The glass also colors in sunlight and develops the ability to absorb visible light centered at 5750 angstroms in proportion to the intensity of the ultraviolet component of the sunlight which is absorbed by the $Eu^{+2}$ absorption band. The glass begins to fade immediately after the exciting ultraviolet light is removed and returns to its original condition in about 1½ minutes or less.

FIG. 2 shows the light absorption characteristics of the soda-silica-europium-containing glass sample prepared as described above in Example I. The sample was ground and polished on both sides to a thickness of 2.84 millimeters and then exposed to various wavelengths of light for various lengths of time.

Curve I of FIG. 2 shows the absorption characteristics of the glass as melted. Curve II of FIG. 2 shows the absorption characteristics after 13 minutes exposure to 3660 angstrom light. Curve II shows the broad absorption band centered at about 5750 angstroms which is responsible for the phototropic behavior or variation in the transmission of visible light exhibited by this type of glass. The absorption band's magnitude pictured in curve II is not the maximum coloration observed during exposure to 3660 angstrom light because the absorption band spontaneously fades while being formed and about 40 seconds were necessary to record the absorption spectrum shown. After removal of the glass from exposure to the 3660 angstrom light, the color in the glass faded and the absorption curve of the glass after fading is substantially the same as curve I of FIG. 2.

Curve III of FIG. 2 shows the slight decrease in the europous ion absorption band centered near 3300 angstroms after the glass sample is exposed to intensive 3660 angstrom light for 20 hours. The curve indicates the fatigue phenomenon and is a clue as to its nature. It is theorized that the fatigue effect is the result of the europous ion being altered when it absorbs the exciting ultraviolet radiation, presumably by photo-oxidation, to a form of europic ion which will not impart the desired phototropic properties to the incipient color center site in the glass. It can be noticed from curve III that after 20 hours intensive exposure to 3660 angstrom light, the absorption band centered at 5750 angstroms is greatly reduced.

Curve IV of FIG. 2 shows the absorption characteristics of the fatigued glass as treated above after it has been further exposed to 2537 angstrom light for 4½ hours. The absorption band centered at 3300 angstroms is now higher than at any previous condition of the glass. It is not known whether this renewed and increased absorption at about 3330 angstroms is due to the presence of increased amounts of the $Eu^{+2}$ or $(Eu^{+3}+e^-)$ ion. It is probably due to the latter since a slight shift in the band maximum toward a higher wavelength can be noted. The data for the curves indicate that as the glass "fatigues," electrons are transferred from the $Eu^{+2}$ ion to some other site where they are trapped. Short ultraviolet irradiation frees the trapped electrons so they can return to the same or another europium ion site.

Curve V of FIG. 2 illustrates the absorption characteristics of the glass as treated above to "fatigue" it and then renew its phototropic effects. When the renewed glass is irradiated with 3660 angstrom light for 8 minutes as was done to obtain the colored glass for curve II, the glass is again colored amethyst. This is illustrated by the absorption band centered at about 5750 angstroms. It can be seen, therefore, that the "fatigue" effect shown in curve III can be overcome and the phototropic effects of the glass renewed by exposure of the glass to 2537 angstrom light.

If an europium doped glass composition is prepared which does not color when irradiated with ultraviolet radiation, this may indicate that inadequate reducing conditions prevailed during melting. Inadequate reducing conditions will cause a shift in the equilibrium concentrations of the europic and europous ions toward a greater concentration of europic ion instead of the desired europous ions. Lack of phototropic behavior may also be due to the presence of some impurity such as iron, vanadium, tantalum, titanium or nickel which is present in sufficient concentrations to poison the phototropic effect. Glasses containing impurities in amounts sufficient to poison the phototropic effect cannot be further treated to produce a phototropic glass, but glasses which do not exhibit phototropic behavior due to inadequate reducing conditions during their preparation can be rendered phototropic by X-ray irradiation. A satisfactory X-ray irradiation treatment of an inadequately reduced glass is irradiation at 45 peak kilovolts and 35 milliamps for 1 hour using a tungsten target X-ray source with a beryllium window.

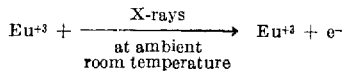

The color induced in the glass by the X-ray treatment is allowed to fade out by letting the glass stand for 24 hours. After the glass has faded, it will exhibit the phototropic behavior described above. An example of a glass produced by insufficient reducing conditions and then made phototropic by X-ray irradiation is set forth below in Example II.

*Example II*

A phototropic glass can be prepared from the following raw materials:

| Ingredient: | Amount (grams) |
| --- | --- |
| $SiO_2$ | 7.9 |
| $Na_2CO_3 \cdot H_2O$ | 8.2 |
| $Eu_2O_3$ | 0.0012 |
| Graphite | 0.1 |

The $SiO_2$, $Na_2CO_3 \cdot H_2O$ and $Eu_2O_3$ are all prepared and introduced into the glass batch in accordance with the methods of Example I. The graphite in powdered form is added to the fused silica and $Na_2CO_3 \cdot H_2O$ powders during the mixing step of Example I by shaking the materials together in a polyethylene container. The graphite introduced into the glass batch is obtained from a crucible of the type described in Example I. The graphite crucible is scraped with a platinum spatula until the required 0.1 gram of graphite powder has been collected.

After the $Eu_2O_3$ in the nitric acid solution has been added to the mixed $SiO_2$, $Na_2CO_3 \cdot H_2O$ and graphite powders in the graphite crucible, the crucible is slowly heated in air to between 850° C. and 900° C. to remove the moisture from the batch.

The same induction coil furnace as described in Example I is used to melt the glass batch. The temperature of the furnace is held between 850° C. and 900° C. for 10 to 15 minutes during which the $Na_2CO_3$ decomposes to $Na_2O$ and $CO_2$. After the $Na_2CO_3$ has been decomposed, the temperature of the furnace is raised to about 1450° C. and held there for about 1 hour. The graphite crucible is then removed from the furnace and allowed to cool in air. No graphite lid is used to cover the graphite crucible during the preparation of this phototropic glass. The reducing conditions desired are obtained through the addition of the graphite to the glass batch raw materials.

The glass that is produced by this procedure is inadequately reduced to exhibit phototropic behavior as made and so must be rendered phototropic by treatment with X-rays. The glass is irradiated with X-rays from a tungsten target source through a beryllium window for 1 hour at 45 peak kilovolts and 35 milliamps on those areas of the glass that are desired to be made phototropic. After X-ray irradiation, the glass is exposed to 3660 angstrom light for about 1 hour and allowed to stand for 24 hours to fade out the color induced in the glass by the X-rays. The glass is then slightly yellow in the absence of ultraviolet radiation and exhibits phototropic behavior upon being exposed to sunlight or some other source of ultraviolet radiation. The glass analyzes as a sodium silicate $(Na_2O \cdot 2.5SiO_2)$ glass containing 86 parts by weight of europium metal per million parts by weight of glass.

Glasses which are partly phototropic have varying degrees of phototropicity or have areas in the form of designs which are more phototropic than other areas can be produced by shielding portions of the glass with lead when the glasses are X-ray irradiated to develop phototropicity as described above. For example, phototropic strips across the top of a glass windshield may be obtained by masking the rest of the windshield with lead when the glass windshield is X-ray irradiated. Other effects including graded areas of phototropicity can be obtained by using various masking techniques which are obvious to X-ray technicians.

FIG. 3 shows the absorption characteristics of the glass sample prepared in Example II. The glass is ground and polished on both sides to a thickness of 1.96 millimeters. Curve I shows the absorption characteristics of the glass sample as melted and curve II shows the absorption characteristics of the glass sample after exposure to X-ray irradiation, fading of the residual X-ray induced color and then exposure to 3660 angstrom light for 10 minutes.

The curves I and II demonstrate the increase in the extinction coefficient at 3350 angstroms due to the production of additional europous $(Eu^{+3}+e^-)$ type of ions from unreduced europic $(Eu^{+3})$ ions by X-rays irradiation. Curve II illustrates the amethyst coloring of the glass upon exposure of the glass to 3660 angstrom light by the presence of the absorption band centered at about 5750 angstroms.

Curve III of FIG. 3 illustrates the "fatigue" effect discussed above in connection with the phototropic glass of Example I. After 20 hours of continuous exposure to 3660 angstrom light, the absorption band centered at 3330 angstroms has decreased and the deep ultraviolet absorption has increased. The absorption band centered at about 5750 angstroms has disappeared thereby showing the loss of the ability of the glass to color amethyst when it is exposed to 3660 angstrom light.

Curve IV of FIG. 3 shows the phototropic renewing effect of the exposure of the fatigued glass to 2537 angstrom light for 2 hours. It can be noted in curve IV that the absorption of light in the band centered at 3330 angstroms is increased considerably. The increased absorption in the band centered at about 5750 angstroms represents a persistent color which is imparted by the exposure of the fatigued glass to 2537 angstrom light. This color does not bleach out readily upon standing, but is removed by irradiation with fluorescent room light for 48 days. Curve IV represents a state of the glass which is very much similar to that of the glass just after it has been X-ray irradiated and before the residual color imparted by X-rays is bleached out. After bleaching of the renewed glass, the glass is phototropic to an even greater extent than the glass in its state as represented by curve II. The increased phototropicity is illustrated in curve V which shows the absorption characteristics of the renewed glass after exposure to 3660 angstrom light for 10 minutes. The absorption band centered at 5750 angstroms indicates the amethyst color of the renewed phototropic glass.

*Example III*

In Table I below are listed various glass compositions that exhibit varying degrees of phototropic behavior. All of the glass compositions listed are prepared from a base glass made from 7.95 grams of fused silica and 8.2 grams of reagent grade $Na_2CO_3 \cdot H_2O$. The various glasses are prepared by adding the amounts of the materials listed in the table to the basic soda-silica glass composition.

Samples Nos. 7 and 8 illustrate that glasses prepared in an open crucible without graphite additions are insufficiently reduced to contain appreciable phototropic effects. Although these samples are made under the same melting conditions, it can be noted that the glass with a relatively large amount of zirconium has a higher extinction coefficient at 5750 angstroms than the glass containing a relatively small amount of titanium, thereby possibly indicating the difference in effect that these two metals have on the phototropicity of a europium containing glass.

It can be noted that there is considerable enhancement in the extinction coefficient at 5750 by X-ray irradiation of glasses melted in an open crucible in the presence of graphite added as a batch material. The same degree of enhancement is not obtained by X-ray irradiation of the samples melted in the closed crucible.

It is theorized that increased sensitization is not realized by X-ray irradiation of glasses melted in closed graphite crucibles because such glasses are prepared under very intense reducing conditions. Since a considerable amount of the europium cations exist as europous ion in the glass structure, the concentration of europous type ions cannot be significantly increased by the action of X-ray radiation. Glasses prepared utilizing graphite additions in an open graphite crucible do not have all of the europium cations that could exist as europous ions in the glass existing in that oxidation state, but have instead a surplus of europium which exists as europic ion which can be reduced to a type of europous ion ($Eu^{+3}+e^-$) to further sensitize the glass to ultraviolet light.

TABLE I

| Sample No. | Batch Additions (grams) $Eu_2O_3$ | Other | Melting Conditions | Max. Absorption at 5,750 A. Produced by 3,660 A. Light Extinction Coefficient cm.⁻¹ Before X-ray | After X-ray | Visual Observations in Sunlight Before X-ray | After X-ray |
|---|---|---|---|---|---|---|---|
| 1 | 0.0012 | | 0.05 grams graphite | 0.28 | 1.03 | Weak | Good. |
| 2 | 0.0012 | | 0.20 grams graphite | 0.03 | 0.67 | | Do. |
| 3 | 0.0012 | | 0.60 grams graphite | 0.01 | 0.43 | | Weak. |
| 4 | 0.0024 | | Closed Crucible | 0.35 | 0.61 | | Good. |
| 5 | 0.0005 | | do | 0.42 | 0.36 | Weak | |
| 6 | 0.0036 | | do | 0.29 | 0.41 | | |
| 7 | 0.0012 | ¹ 0.0005 | Open Crucible | 0.00 | 0.05 | | |
| 8 | 0.0012 | ² 0.166 | do | 0.16 | 0.17 | | |

¹ $TiO_2$.
² $ZrO_2$.

All europium additions are made as $Eu_2O_3$ in a dilute nitric acid solution whose preparation is described in Example I. The graphite, $ZrO_2$ and $TiO_2$ additions are all added as powders to the soda-silica raw materials.

Three degrees of reducing conditions are compared under the heading "Melting Conditions." The degree of reduction increases as the glass is prepared, first in an open graphite crucible, then containing graphite additions in an open graphite crucible or finally in a closed graphite crucible.

Data is listed which compares the maximum ability of several phototropic glasses to absorb light at 5750 angstroms when the glass is excited with 3660 angstroms ultraviolet light for 8 to 15 minutes. The absorption data is given for glass samples approximately 3.0 millimeters thick and in terms of the extinction coefficient for 5750 angstrom light. It should be noted that any glass sample approximately 3.0 millimeters thick which colors to the extent of having an extinction coefficient of 0.40 cm.⁻¹ or better for 5750 angstrom light when excited with 3660 angstrom light, will also color reasonably well in sunlight.

The results listed under sunlight testing are qualitative. A dash indicates that the glass being tested exhibited little or no phototropic behavior. Blank spaces indicate that the test was not performed.

*Example IV*

A phototropic glass can be prepared which consists of a glass composition that is similar to a conventional plate or window glass utilizing the following materials:

Batch ingredient: Weight (grams)
$SiO_2$ _____ 8.61
$Na_2CO_3$ _____ 2.90
$CaC_2O_4$ _____ 3.27
$MgC_2O_4$ _____ 1.04
$Eu_2O_3$ _____ 0.0012

The source of the $SiO_2$ is fused silica which is prepared and purified in the same manner as the fused silica in Example I. The $Na_2CO_3$ and $Eu_2O_3$ are the same reagent grade materials as described and prepared in Example I. The calcium and magnesium oxalates are prepared by precipitating them from solutions of calcium nitrate and magnesium acetate.

Reagent grade calcium nitrate, used as purchased, is slowly added to 50 cubic centimeters of distilled water in a 400 cubic centimeter Pyrex beaker until a saturated solution of calcium nitrate is obtained. Twenty (20) cubic centimeters of reagent grade oxalic acid is then added to the saturated solution of calcium nitrate to precipitate calcium oxalate from the solution. The precipitate is filtered out of the solution and the filtrate is thrown away. The precipitated calcium oxalate is dried in an oven overnight at about 100° C., allowed to cool and the quantity for the glass batch weighed out.

The magnesium oxalate for the glass batch is prepared from a magnesium acetate solution in the same manner described for the preparation of the calcium oxalate.

The $SiO_2$, $Na_2CO_3 \cdot H_2O$, $CaC_2O_4$ and $MgC_2O_4$ are thoroughly mixed together by shaking in a new, unused polyethylene container. The mixed batch materials are introduced into the melting chamber of a graphite crucible of the same type as described in Example I. Twelve ten-thousandths (0.0012) gram of $Eu_2O_3$ is introduced into the glass batch materials by adding ½ of a cubic centimeter of the dilute nitric acid solution prepared according to Example I.

A glass that exhibits phototropic behavior is produced from these raw materials utilizing the same melting procedure and equipment disclosed in Example I with the exception that the glass is melted at 1525° C. rather than 1600° C.

Upon irradiating the glass with ultraviolet light of 3660 angstrom wavelength, the glass visibly colors and develops the ability to absorb a band of light centered at about 5750 angstroms wavelength. The glass also colors in sunlight and develops the ability to absorb the same band of light centered at 5750 angstrom light in proportion to the intensity of the ultraviolet component of the sunlight in the range of 3660 angstroms. The glass colors to a maximum level when excited with ultraviolet radiation in about 5 minutes. The glass begins to fade as soon as the exciting ultaviolet radiation is removed and is almost colorless in about 1½ minutes. The fading time for phototropic plate glass compositions is a little longer than for soda-silica ($Na_2O \cdot 2SiO_2$) glasses.

*Example V*

A group of phototropic glass compositions were prepared which utilized the plate glass composition of Example IV as the base glass to which varying amounts of $Eu_2O_3$ were added.

The glasses were prepared in accordance with the procedure outlined and the purified raw materials listed in Example IV.

The following Table II shows the effect of different europium additions to the base plate glass composition on the extinction coefficilents for 5750 angstrom light exhibited by the glass samples when excited with 3660 angstrom light:

TABLE II

| Plate Glass Sample No. | Weight of Eu in glass Calculated in Parts by Weight of Eu per Million Parts by Weight of the Eu Containing Plate Glass | Maximum Absorption in Glass Samples Approximately 1.5 Millimeters Thick at 5,750 Angstroms with Exciting Light of 3,660 Angstroms, Extinction Coefficient in cm.$^{-1}$ |
|---|---|---|
| 1 | 35 | 0.25 |
| 2 | 86 | 0.45 |
| 3 | 172 | 0.61 |
| 4 | 258 | 0.69 |
| 5 | 344 | 0.75 |
| 6 | 430 | 0.88 |
| 7 | 516 | 0.92 |
| 8 | 688 | 0.98 |
| 9 | 774 | 0.80 |
| 10 | 860 | [1] 0.57 |
| 11 | 1030 | 0.82 |
| 12 | 3440 | 0.24 |

[1] The Eu was added to this batch as dry powdered $Eu_2O_3$ while it was added to all other samples as a solution in dilute $HNO_3$. This indicates the effect of Eu is somewhat greater when the material is thoroughly dispersed through the glass batch by being introduced in a solution.

The various samples differ in color when exposed to 3660 ultraviolet light. This is because of the yellow color present in the glass as melted. The glasses with the smaller amounts of europium tend toward an amethyst color with a purple tint, while those containing the larger amounts of europium tend toward an amethyst color with a gray tint.

In general, plate glass compositions melted with graphite in the batch do not color as well in sunlight prior to X-ray irradiation as do similar compositions prepared in a closed graphite crucible. This result is consistent with the basic theory of phototropic behavior in that the phototropic behavior is directly related to the degree of reduction of the glasses' constituents. The graphite additions do not produce as high a degree of reduction as do the preparations of the glasses in a closed graphite crucible.

X-ray irradiation also also does not appear to sensitize plate glass compositions prepared with graphite in the batch to as great an extent as with soda-silica glasses. X-ray irradiation does affect such glasses in that it will renew phototropicity in glass specimens fatigued by prolonged exposure to 3660 angstrom light.

*Example VI*

A phototropic glass can be prepared from the following raw materials:

| Ingredient: | Weight (grams) |
|---|---|
| $SiO_2$ | 7.95 |
| $Na_2CO_3.H_2O$ | 8.2 |
| $Eu_2O_3$ | 0.0012 |
| $ZrO_2$ | 0.0016 |

The $SiO_2$, $Na_2CO_3.H_2O$ and $Eu_2O_3$ are prepared and combined in the same manner described in Example I. The $ZrO_2$ is a reagent grade chemical. The $ZrO_2$ is added as a dry powder to the $SiO_2$ and $Na_2CO_3.H_2O$ powders during the mixing step of these materials as described in Example I. The melting procedure for the glass batch materials after the $SiO_2$, $Na_2CO_3.H_2O$ and $ZrO_2$ powders have been thoroughly mixed and the $Eu_2O_3$ in the dilute nitric acid solution has been added to them is the same as that described in preparing the phototropic glass of Example I. The required reducing conditions during the present glass preparation are obtained through the use of a lid on the graphite crucible instead of graphite additions utilized in the production of Sample No. 8 listed in Table I in Example III. The glass produced by this procedure exhibits phototropic behavior far superior to that of Sample No. 8 of Table I.

*Example VII*

A phototropic glass can be prepared from the following raw materials:

| Ingredient: | Weight (grams) |
|---|---|
| $SiO_2$ | 7.95 |
| $Na_2CO_3.H_2O$ | 8.2 |
| $Eu_2O_3$ | 0.0012 |
| $Ni(NO_3)_2 \cdot 6H_2O$ | 0.0004 |

The $SiO_2$, $Na_2CO_3.H_2O$ and $Eu_2O_3$ are procured, purified and added to the glass batch in the same manner described in Example I. The $Ni(NO_3)_2 \cdot 6H_2O$ is a reagent grade chemical. The nickel is added as a solution. Five milliliters of solution were used from a stock solution prepared by dissolving 0.040 g. of $Ni(NO_3)_2 \cdot 6H_2O$ in 500 milliliters of water. The mixed powdered raw materials are placed in a graphite crucible and the $Eu_2O_3$ added as described in Example I.

The melting procedure for the glass batch is the same as that utilized in Example I except that no graphite lid is used to insure high reducing conditions. The entire melting procedure is performed with the crucible exposed to the open air. The glass produced is slightly yellow in color and exhibits phototropic behavior. The intensity of the color induced by the exciting ultraviolet light in the glass can be slightly increased if the glass is irradiated with the X-ray treatment disclosed in Example II.

Example VIII

A phototropic glass is prepared from the following batch materials:

| Ingredient: | Weight (grams) |
| --- | --- |
| $SiO_2$ | 8.61. |
| $Na_2CO_3$ | 2.90. |
| $CaC_2O_4$ | 3.27. |
| $MgC_2O_4$ | 1.04. |
| $Eu_2O_3$ | Eu (100 p.p.m.). |
| $HfO_2$ | Hf (2000 p.p.m.). |

The $SiO_2$, $Na_2CO_3$, $CaC_2O_4$ and $MgC_2O_4$ are all purified and incorporated into the batch in accordance with the experimental procedure outlined in Example IV. The $HfO_2$ is added to the batch materials as $HfO_2$ powder and thoroughly mixed in the polyethylene container and placed in a graphite crucible similar to the procedures described in Example IV. Six-tenths (0.6) of a milliliter of a $Eu_2O_3$ solution prepared as described in Example I are added to the batch to provide 100 parts by weight of Eu metal per million parts by weight of glass. The glass is prepared by the same heating schedule used to melt the glass sample in Example IV. A phototropic glass having an amethyst color is obtained. It has been observed that the presence of hafnium in the glass provides a deeper color to the glass for equivalent amounts of Eu metal.

The presence of hafnium oxide is a europium containing phototropic glass permits lower amounts of europium to be used to obtain the desired depth of color in the glass when it is exposed to solar or ultraviolet light. This means that the intrinsic yellow color of the glass is of a reduced order and may be only faintly visible in ⅛ and ¼ inch thicknesses of glass.

It has also been found that the incorporation of small amounts of certain oxides and combination thereof, such as the colored oxides of the 4f inner transition metals, praseodymium, neodymium, holmium and erbium provides a different color to the europium containing phototropic glasses described above. This is somewhat contrary to the general theory stated hereinbefore that the presence of commonly known coloring cations of transition metals, such as iron, titanium, vanadium, chromium and cobalt in the glasses of the present invention, in an amount to provide substantial intrinsic color to the glasses, will probably poison and prevent the phototropic behavior of the glasses. The oxides of praseodymium, neodymium, holmium and erbium color the europium containing glasses green, blue, peach and pink, respectively. Specific examples of these glasses are as follows:

Example IX

A phototropic glass is prepared according to Example I in which there is incorporated sufficient erbium oxide to obtain 0.88 percent by weight of erbium in the glass. This glass has a light peach color as melted. After exposure to 3660 angstrom light for 8 minutes, the glass possesses a pink color. Upon removal of the 3660 angstrom light, the glass returns to the peach color.

Example X

A phototropic glass is prepared according to Example I in which there is incorporated sufficient neodymium oxide to obtain 0.8 percent by weight of neodymium in the glass. This glass has an aqua color as melted. After exposure to 3660 angstrom light for 5 minutes, the glass possesses a deep blue color. Upon removal of the 3660 angstrom light, the glass returns to the aqua color.

Example XI

A phototropic opthalmic glass is prepared according to the procedure of Example I. The glass is melted at 1450 to 1500 C. for several hours. When prepared, the glass contained 100 parts of europium per million parts by weight of glass in a base glass having the following calculated chemical analysis in percent by weight: 40.0% $SiO_2$, 45.4% BaO, 6.9% ZnO, 6.0% $Ba_2O_3$, 3.6% $Al_2O_3$, 0.9% $K_2O$ and 0.2% CaO.

The glass is yellow as melted and turns amethyst upon irradiation with 3660 angstrom light. The absorption curve for sample 3.22 millimeters thick shows an absorption band centered at 5750 angstroms.

Example XII

Phototropic glasses having the calculated compositions and made according to the processes described in Examples I to XI can be formed into fibers and utilized in conventional applications, for example, strands, etc.

Strands of such glass may be incorporated as reinforcements in polyester or epoxy resins according to conventional techniques for making glass fiber-reinforced resinous panels. A phototropic panel may thereby be obtained which will vary in transmittance properties, as it is exposed to different wavelengths and intensities of light.

Almost any reduced silicate glass composition can produce a phototropic glass provided: (1) the proper amount of europium is added to the batch; (2) the europium and glass are properly reduced; and (3) the raw materials and final reduced glass do not contain amounts of transition elements and other poisoning elements which inhibit the phototropic effect.

The invention is not limited to the embodiments which have been described by way of example, and it would not be a departure from its scope to incorporate modifications, either as regards the composition of the base glass or the procedure used to prepare the glass. Any method in which europium is incorporated into a base glass composition as the agent that develops phototropic behavior of the resultant glass will not be a departure from the invention.

I claim:

1. A strongly reduced phototropic glass composition consisting essentially of a glass base composition selected from the group consisting of soda-silica and soda-lime-silica glass compositions of high purity containing up to about 3440 parts by weight of europium per million parts by weight of said europium-containing glass base composition, said europium being in the form of europous ($Eu^{+2}$) ion and containing a substantial quantity of incipient metastable color centers which exhibit an absorption band at about 5750 angstroms in the visible range.

2. A phototropic glass article consisting essentially of a glass base composition selected from the group consisting of soda-silica and soda-lime-silica glass compositions of high purity containing up to about 3440 parts by weight of europium per million parts by weight of said europium-containing glass base composition, said europium being in the form of europous ($Eu^{+2}$) ion, and containing a substantial quantity of incipient metastable color centers which exhibit an absorption band at about 5750 angstroms in the visible range and which is substantially free of impurity metals selected from the group consisting of iron, vanadium, tantalum, titanium and mixtures thereof.

3. A process for the production of a phototropic glass which comprises heating a glass composition consisting essentially of a glass base composition selected from the group consisting of soda-silica and soda-lime-silica glass compositions of high purity containing up to about 3440 parts by weight of europium per million parts by weight of said europium-containing glass base composition to a temperature above the melting point of said glass base composition in the substantial absence of oxygen and in the presence of carbon until said europium is developed into europous ($Eu^{+2}$) ion and then until a cooled portion of said heated molten glass composition contains a substantial quantity of incipient metastable color centers which exhibit an absorption band at about 5750 angstroms in the visible range and thereupon immediately cooling said heated molten glass composition in the substantial absence of oxygen.

4. A process for the production of a phototropic glass which comprises heating a glass composition consisting essentially of a glass base composition selected from the group consisting of soda-silica and soda-lime-silica glass compositions of high purity containing up to about 3440 parts by weight of europium per million parts by weight of said europium-containing glass base composition to a temperature above the melting point of said glass base composition in the substantial absence of oxygen and in the presence of carbon until a cooled portion of said heated molten glass composition contains a substantial quantity of incipient metastable color centers which exhibit an absorption band at about 5750 angstroms in the visible range, and in which a proportion of the europium is present in the form of europic ($Eu^{+3}$) ions, cooling said heated molten glass composition in the substantial absence of oxygen and thereafter irradiating the cooled glass with X-ray irradiation to ionize europic ($Eu^{+3}$) ions to ($Eu^{+3}+e^-$) ions in the glass.

5. A process according to claim 4 in which only a portion of the glass is irradiated with X-ray irradiation to ionize europic ($Eu^{+3}$) ions to ($Eu^{+3}+e^-$) ions in the portion irradiated.

References Cited by the Examiner
UNITED STATES PATENTS

| 2,722,519 | 11/1955 | Otley | 88—106 |
| 2,859,163 | 11/1958 | Ploetz et al. | 106—47 |

OTHER REFERENCES

Cohen et al.: Science, Sept. 21, 1962, page 981.

Ginther et al.: "Glass Scintillators," I.R.E. Trans. Nucl. Sci., NS–5(3), January 1958.

TOBIAS E. LEVOW, *Primary Examiner.*

H. McCARTHY, *Assistant Examiner.*